United States Patent [19]

McCauley

[11] 3,941,519

[45] Mar. 2, 1976

[54] PUMP

[76] Inventor: Herbert J. McCauley, 86 Dana Road, Buffalo, N.Y. 14216

[22] Filed: Sept. 12, 1974

[21] Appl. No.: 505,580

[52] U.S. Cl. .......... 417/560; 137/512.4; 137/525.3; 417/542; 417/566
[51] Int. Cl.² ...................................... F04B 21/02
[58] Field of Search .......... 417/479, 560, 566, 542; 137/525, 525.3, 512.4

[56] References Cited
UNITED STATES PATENTS

| | | | |
|---|---|---|---|
| 2,980,032 | 4/1961 | Schneider | 417/479 |
| 3,205,829 | 9/1965 | Andersen et al. | 417/542 |
| 3,415,198 | 12/1968 | Lappo | 417/542 |
| 3,424,091 | 1/1969 | Turner | 417/542 |
| 3,556,687 | 1/1971 | O'Connor | 417/479 |
| 3,812,878 | 5/1974 | Bird et al. | 137/525.3 |

FOREIGN PATENTS OR APPLICATIONS

| | | | |
|---|---|---|---|
| 636,040 | 3/1962 | Italy | 137/525 |
| 1,197,226 | 7/1970 | United Kingdom | 417/446 |

Primary Examiner—C. J. Husar
Assistant Examiner—O. T. Sessions
Attorney, Agent, or Firm—Christel & Bean

[57] ABSTRACT

A reciprocating type pump has a pair of body members with complementary concave and convex surfaces which clamp a flexible sheet means therebetween to hold the same in curved configuration. The member having the convex surface has a pump chamber opening toward the flexible sheet means and the concave member has inlet and outlet passages opening toward the flexible sheet. The flexible sheet has portions overlying such inlet and outlet passages and the overlying portions have free edge portions extending in the direction of curvature of the flexible sheet and adapted to be flexed toward said convex surface member by fluid pressure from said passages whereby the overlying portions of the flexible sheet are reversely curved under the force of said fluid pressure and return resiliently to original passage closing condition when such pressure is not acting thereagainst.

9 Claims, 3 Drawing Figures

PUMP

BACKGROUND OF THE INVENTION

This invention relates to reciprocating fluid pumps and particularly to novel one-way valve means for such pumps.

A common weakness of one-way valves or check valves such as are used in fluid pumps is the likelihood of the valves to become clogged with solid foreign matter, particularly when such pumps are used as bilge pumps or in other instances where the fluid being pumped may contain debris of one kind or another.

When such valves of the prior art are clogged by foreign matter they fail to close and the output of the pump is greatly reduced or may cease altogether.

Similar difficulties are encountered in the case of check valves which are urged to closed position by mechanical springs. If the spring breaks or becomes fouled in some way the output of the pump is similarly reduced or ceased entirely.

SUMMARY OF THE INVENTION

In the present invention the valve element itself comprises a sheet of rubber or similar flexible material which may be flat in its free state but which is clamped between a pair of complementary members which are transversely arched to dispose the valve sheet in a transversely arcuate disposition.

As will appear more clearly from the ensuing detailed description of a principal embodiment of the invention, certain edge portions of the arcuately disposed rubber sheet member are free to flex inwardly toward the axis of the arcuate formation under fluid pressure. This reverse flexure of the sheet member at its valving portions is such that the sheet member returns quickly to its initial arcuate disposition when the fluid pressure thereagainst ceases or is reversed due to the resiliency of the valve sheet and the reverse curvature which is produced therein by fluid pressure.

DESCRIPTION OF THE ILLUSTRATED EMBODIMENT

Figure 1:
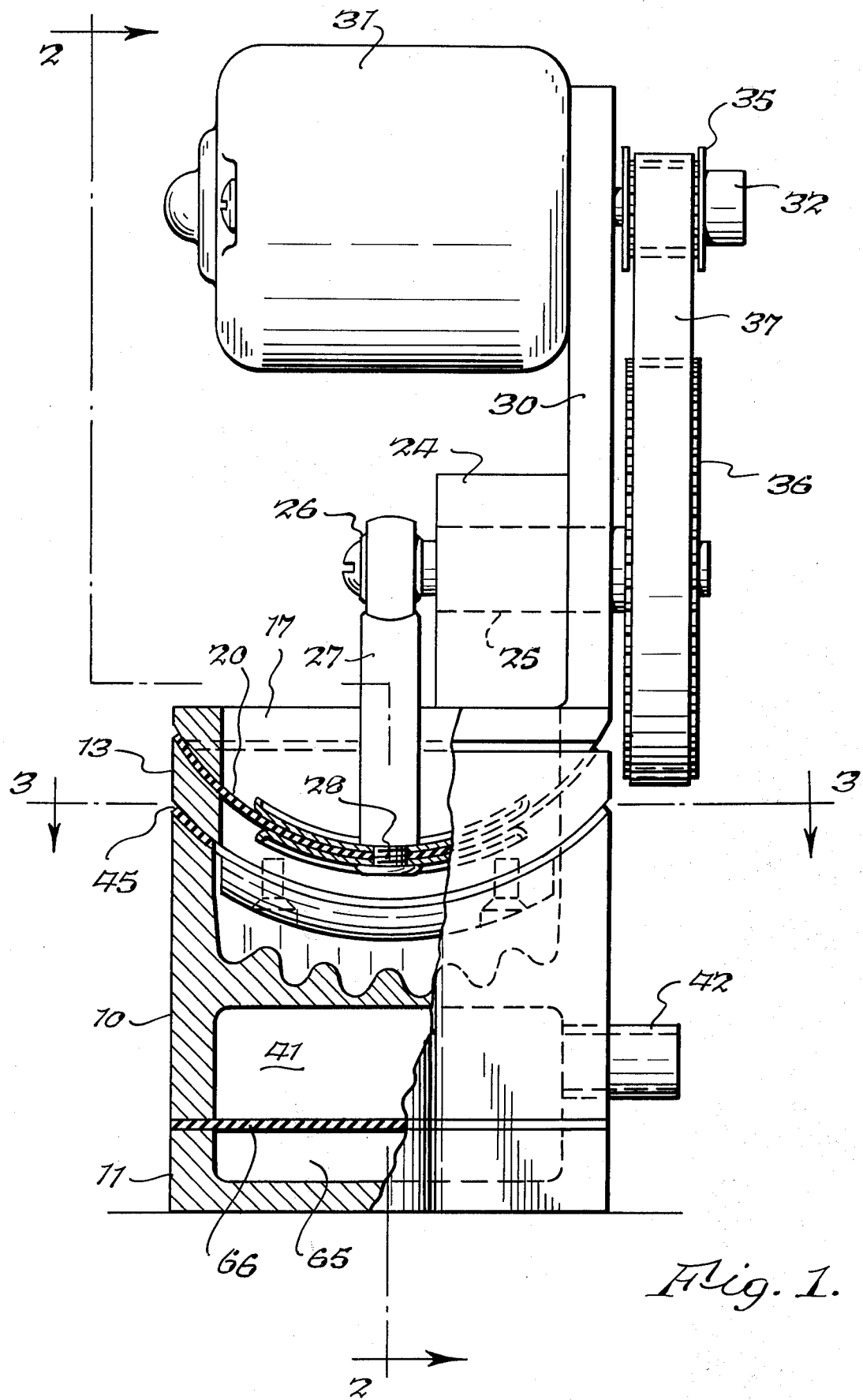
FIG. 1 is an elevational view with the lower portion thereof in cross section as indicated by the line 1—1 of FIG. 2.
Figure 2:
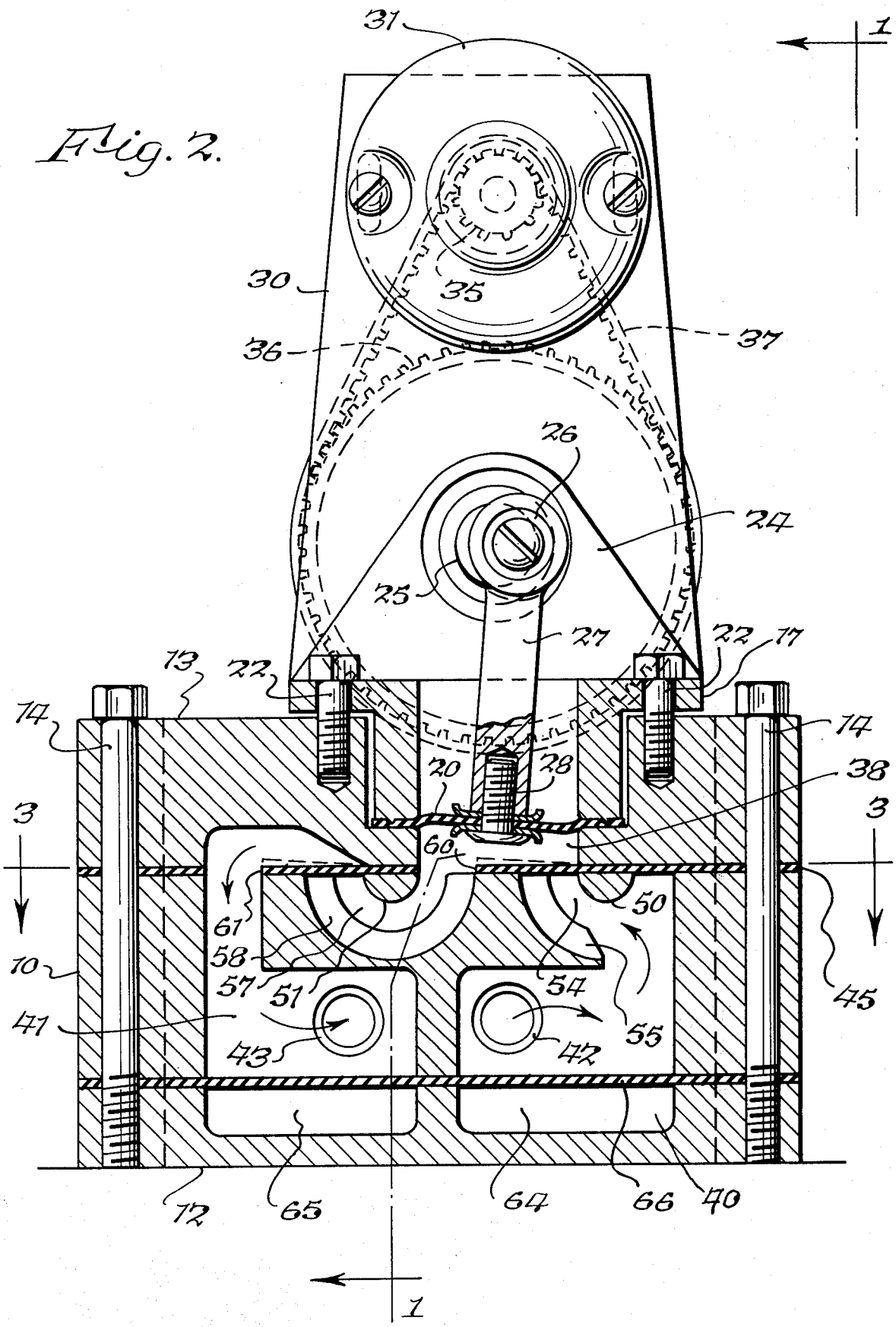
FIG. 2 is a view at right angles to FIG. 1, again partly in cross section as indicated by the line 2—2 of FIG. 1.

In FIGS. 1 and 2 the numeral 10 designates a body member which seats upon a base member 12 and is provided with a cover member 13. Body member 10, base member 12 and cover member 13 are retained in assembled position by a pair of screw members 14 which extend downwardly through registering lugs on the body, base and cover members.

A diaphragm pump assembly is mounted upon cover member 13 and in the present instance includes a block 17 which has an arcuate lower face which seats in a depression in cover member 13, the depression having a complementary arcuate upper surface portion as clearly shown in FIG. 1 whereby a flexible diaphragm member 20 is held between the complementary arcuate faces just described. Block 17 is secured to cover member 13 by a pair of screws 22 which clamp the marginal portions of the diaphragm 20 between the complementary arcuate faces of cover member 13 and block 17.

Block 17 includes, or has fixed thereto, bearing member 24 in which is journaled a shaft 25 having an eccentric formation 26 at its left-hand end as viewed in FIG. 1. A connecting rod 27 is rotatable at its upper end on eccentric formation 26 and is attached to the mid portion of diaphragm 20 by a screw 28 as clearly shown in FIGS. 1 and 2.

Block 17 includes an upwardly extending wall 30 to which is mounted an electric driving motor 31. The drive shaft 32 of driving motor 31 and the right-hand portion of eccentric shaft 25 as viewed in FIG. 1 are provided with mating sprockets 35 and 36 which are connected by a toothed belt member 37.

The mid portion of diaphragm 20 is thus reciprocated in a generally vertical direction and diaphragm 20 together with the opening in cover member 13 lying directly beneath the diaphragm form an expansible pump chamber 38. The body member 10 includes a fluid inlet chamber 40 and an outlet chamber 41 the latter chamber comprising an outlet passage extension beyond the flexible sheet means. Connections to the inlet and outlet chambers are shown in FIG. 3 and are designated 42 and 43, respectively.

The lower face of cover member 13 is convexly arcuate in transverse cross section, as clearly shown in FIG. 1, and the upper face of body member 10 is of complementary arcuate form. A valve member 45 comprises a normally flat sheet of rubber or similar elastic material which is clamped into the transversely arcuate form shown in FIG. 1 by the complementary arcuate surfaces of body member 10 and cover member 13. Valve member 45 is provided with a pair of rectangular openings 46 and 47 as shown in FIG. 3.

Valve member 45 is attached to the arcuate lower face of cover member 13 by a pair of arcuate rail members 50 and 51 which are screwed to the lower arcuate face of the cover member with the valve sheet 45 clamped therebetween.

Figure 3:
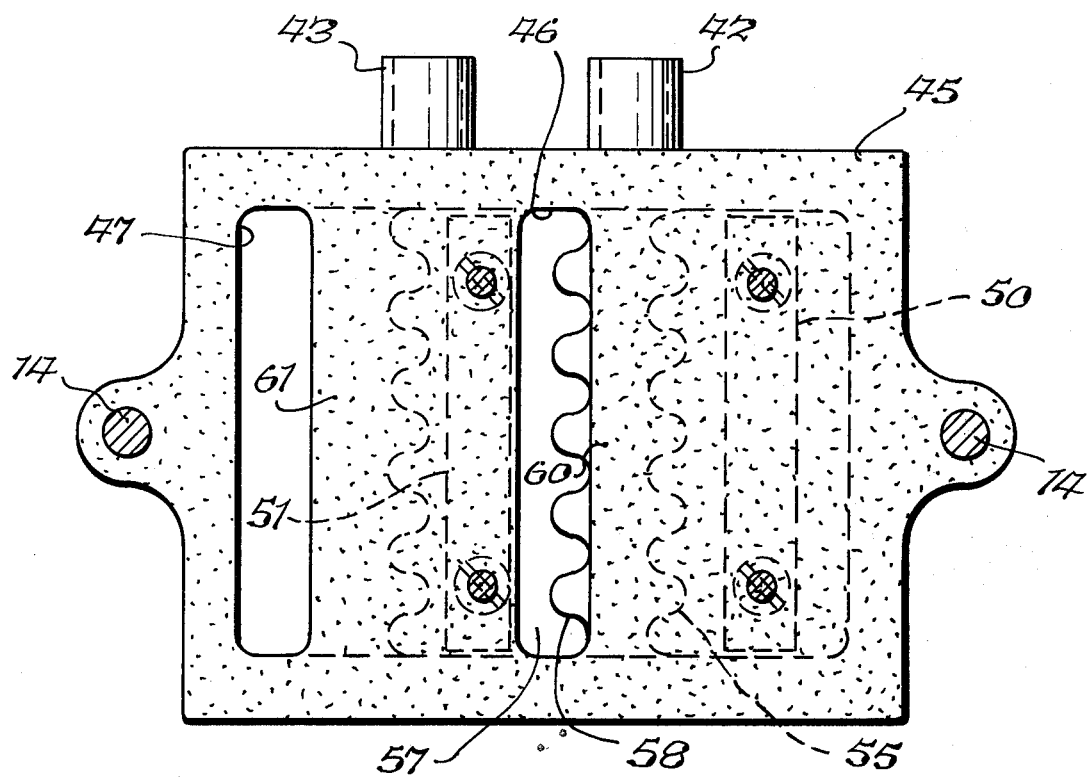
FIG. 3 is a horizontal cross sectional view taken as indicated by the lines 3—3 of FIGS. 1 and 2.

An arcuate passage 54 extends upwardly from inlet chamber 40 to the under side of valve 45 and it will be noted, by reference to FIGS. 2 and 3, that the left-hand side of passage 54 as viewed in FIG. 2 is defined by a series of tongue and groove formations 55 which are provided to give additional support to the under side of valve 45 while still permitting an adequate fluid flow area through the passage, and the tongue and groove formations also channel the flow of fluid through passage 54 to avoid concentration of the fluid flow toward the mid point of the passage as it would ordinarily tend to do.

A second arcuate fluid passage 57 extends from pump chamber 38 to the under side of the portion of valve 45 which is adjacent to the left-hand arcuate clamping bore 51 and, as likewise illustrated in FIGS. 2 and 3, the lower surface of passage 57 is defined by arcuate tongue and groove formations 58. The tongue and groove formations 58 are for the same general purposes as the formations 55 at the inlet passage 54.

OPERATION

From the foregoing, it will be noted that the portions of valve sheet 45 which are immediately to the right of the openings 46 and 47 therein, such portions being designated 60 and 61, respectively, act in the nature of flap valves or lip portions which are adapted to flex outwardly from their normal abutting positions with respect to the underlying top surface portions of valve body member 10. Thus, when diaphragm 20 is moving upwardly to create suction in chamber 38 differential pressure above lip portion 61 of the valve 45 retains the same in closed position with respect to body member 10 while pressure in passage 54 at the inlet side causes the lip portion 60 of the valve to be flexed upwardly as shown by dash lines in FIG. 2 to establish fluid flow from inlet chamber 40 of body member 10 to pump chamber 38.

Conversely, when diaphragm 20 moves downwardly and creates superatmospheric pressure in pump chamber 38 lip portion 60 of valve 45 immediately closes and the pressure of fluid in outlet passage 57 against the underside of lip portion 61 raises this portion of the valve member to establish fluid flow from pump chamber 38 to outlet chamber 41.

The tendency of the fluid flow to be accentuated at the center of the passage, considered along its length, as mentioned heretofore in describing the tongue and groove formations 55 and 58, is due at least in part to the nature of the buckling action of the valve lips 60 and 61 as they curve reversely under pressure therebeneath at both the inlet and outlet passages. The channeling of the fluid flow by the tongue and groove formations 55 and 58 substantially minimizes this tendency to centralization and causes the valve lips 60 and 61 to open more uniformly along their lengths under the influence of fluid pressure. The tongue formations also provide additional support for the valve lips 60 and 61 without interfering with free flow therethrough.

By reference to FIG. 2 particularly, it will be noted that base member 12 is provided with a pair of cavities 64 and 65 which directly underlie the inlet and outlet chambers 40 and 41, respectively, and a continuous diaphragm 66 of rubber or other elastic material is interposed and clamped between body member 10 and base member 12. The cavities 64 and 65 act somewhat in the nature of surge chambers since the diaphragm 66 tends to flex toward and away from the cavities 64 and 65 under variations in the fluid pressure in the inlet and outlet chambers 40 and 41. This tends to smooth the fluid flow into the pump and out of the outlet connection 43.

A preferred embodiment has been described herein and shown in the accompanying drawings to illustrate the underlying principles of the invention but it is to be understood that numerous modifications may be made with departing from the broad spirit and scope of the invention.

I claim:
1. In an expansible chamber pump, a pair of body members having opposed complementary concave and convex curved faces in transverse cross section, said faces being rectilinear in longitudinal cross section, flexible sheet means clamped between said faces to be held in curved configuration thereby, said convexly curved member having a pump chamber therein and reciprocable means for alternately expanding and contracting the same, said pump chamber opening toward said flexible sheet means, pump inlet and outlet passages in said concavely curved member and opening toward said flexible sheet means, said flexible sheet means having portions overlying said inlet and outlet passage openings, said overlying portions being connected to the flexible sheet means proper but having substantially rectilinear free edge portions extending in the direction of curvature of said flexible sheet means and adapted to be flexed toward said convexly curved member by fluid pressure from said inlet passage toward said pump chamber and by fluid pressure from said pump chamber toward said outlet passage.

2. A pump according to claim 1 wherein said complementary curved faces are arcuate.

3. A pump according to claim 1 wherein said flexible sheet means comprises a single sheet having openings therein providing said free edge portions.

4. A pump according to claim 1 wherein said inlet and outlet passages are laterally elongated to approximate the lengths of said free edge portions.

5. A pump according to claim 4 wherein said laterally elongated passages are provided with a series of parallel channels extending in the direction of fluid flow to maintain lateral distribution of said fluid to said passage overlying portions of said flexible sheet means.

6. A pump according to claim 2 wherein said flexible sheet means comprises a single sheet having openings therein providing said free edge portions.

7. A pump according to claim 3 wherein said inlet and outlet passages are laterally elongated to approximate the lengths of said free edge portions.

8. A pump according to claim 1 wherein said pump outlet passage has an extension beyond said flexible sheet means.

9. A pump according to claim 8 having a pair of surge chambers adjacent to said inlet passage and said outlet passage extension, and flexible sheet means dividing said surge chambers from said inlet passage and said outlet passage extension.

* * * * *